US008936262B2

(12) United States Patent
Nabeta

(10) Patent No.: US 8,936,262 B2
(45) Date of Patent: Jan. 20, 2015

(54) WALKER WITH POSITIONABLE HANDLES

(76) Inventor: Esther Juliet V. Nabeta, Tustin, CA (US)

( * ) Notice: Subject to any disclaimer, the term of this patent is extended or adjusted under 35 U.S.C. 154(b) by 254 days.

(21) Appl. No.: 13/461,455

(22) Filed: May 1, 2012

(65) Prior Publication Data

US 2013/0292916 A1 Nov. 7, 2013

(51) Int. Cl.
*B62B 3/02* (2006.01)

(52) U.S. Cl.
USPC .................... 280/87.021; 280/47.371; 135/67

(58) Field of Classification Search
CPC ....... F02B 60/04; F02B 63/047; A47D 1/004; A47D 1/008; A47D 1/02; A61H 2003/046; A61H 2201/0161; A61H 2201/1633; B62B 3/02
USPC ............ 280/47.371, 47.41, 47.34, 30, 304.1, 280/638, 639, 642, 643, 647, 650, 655, 280/655.1, 87.05, 87.051, 47.36, 47.38, 280/47.39, 47.4; 135/66, 67; 403/109.1, 403/161; 16/429
See application file for complete search history.

(56) References Cited

U.S. PATENT DOCUMENTS

| | | | | |
|---|---|---|---|---|
| 2,855,024 | A * | 10/1958 | Thomson | 135/67 |
| 2,866,495 | A * | 12/1958 | Diehl et al. | 297/6 |
| 3,161,973 | A * | 12/1964 | Hastings | 40/591 |
| 3,259,427 | A | 7/1966 | West | |
| 3,759,544 | A | 9/1973 | Korpela | |
| 4,748,994 | A * | 6/1988 | Schultz et al. | 135/67 |
| 4,843,661 | A | 7/1989 | Skibinski | |
| 5,224,721 | A | 7/1993 | Santmann | |
| 5,224,731 | A | 7/1993 | Johnson | |
| 5,265,969 | A | 11/1993 | Chuang | |
| 5,295,498 | A | 3/1994 | Van Meter et al. | |
| 5,451,193 | A | 9/1995 | Pickard | |
| 5,558,358 | A | 9/1996 | Johnson | |
| 5,613,256 | A | 3/1997 | Hanson | |
| 5,687,984 | A * | 11/1997 | Samuel | 280/641 |
| 6,062,587 | A * | 5/2000 | Cabagnero | 280/642 |
| 6,142,573 | A | 11/2000 | Harding et al. | |
| 6,338,355 | B1 * | 1/2002 | Cheng | 135/67 |
| 6,338,493 | B1 | 1/2002 | Wohlgeamuth et al. | |
| 6,464,243 | B2 * | 10/2002 | Roche | 280/650 |
| 6,481,730 | B2 * | 11/2002 | Sung | 280/87.05 |
| 6,837,503 | B2 * | 1/2005 | Chen et al. | 280/87.021 |
| 6,990,990 | B2 | 1/2006 | Wilensky et al. | |
| 6,996,864 | B2 | 2/2006 | Call | |
| 7,040,637 | B2 | 5/2006 | Owens et al. | |
| 7,066,484 | B2 * | 6/2006 | Willis et al. | 280/642 |
| 7,070,198 | B2 * | 7/2006 | Lin | 280/655.1 |
| 7,377,285 | B2 | 5/2008 | Karasin et al. | |
| 7,475,888 | B2 * | 1/2009 | Craig et al. | 280/47.18 |
| 7,481,445 | B1 | 1/2009 | Danziger | |
| 7,494,138 | B2 * | 2/2009 | Graham | 280/87.021 |
| 7,628,411 | B2 * | 12/2009 | Meyers et al. | 280/87.021 |
| 7,926,834 | B2 * | 4/2011 | Willis | 280/650 |
| 7,980,572 | B2 * | 7/2011 | Bennett | 280/87.021 |
| 8,166,987 | B2 * | 5/2012 | Weaver | 135/67 |
| 8,454,049 | B2 * | 6/2013 | Chen et al. | 280/650 |

(Continued)

*Primary Examiner* — Brodie Follman
(74) *Attorney, Agent, or Firm* — Stetina Brunda Garred & Brucker; Lowell Anderson

(57) ABSTRACT

A walker has a frame with two opposing sides joined at a front of the walker, each side having front and rear legs and a handle at a top of each side. Each handle is connected to the frame through a rotatable joint so the handles have a first position a first position in which the handle is generally horizontal for walking, and a second position in which that handle is lowered closer to the seat making it easier to sit and stand. The joint is locked into each position.

15 Claims, 6 Drawing Sheets

(56) References Cited

U.S. PATENT DOCUMENTS

| | | | | |
|---|---|---|---|---|
| 8,708,363 | B1 * | 4/2014 | Chang | 280/642 |
| 2002/0153684 | A1 * | 10/2002 | Sung | 280/87.021 |
| 2003/0085540 | A1 * | 5/2003 | Sadow | 280/47.26 |
| 2003/0086752 | A1 * | 5/2003 | LeMole | 403/102 |
| 2004/0013553 | A1 * | 1/2004 | Wu | 417/572 |
| 2005/0001398 | A1 * | 1/2005 | Serhan | 280/87.01 |
| 2006/0076779 | A1 * | 4/2006 | Craig et al. | 290/1 A |
| 2006/0138270 | A1 * | 6/2006 | Lichtscheidl et al. | 242/396.1 |
| 2007/0283990 | A1 * | 12/2007 | Fernandez et al. | 135/67 |
| 2008/0135077 | A1 * | 6/2008 | Meyers et al. | 135/66 |
| 2008/0202571 | A1 * | 8/2008 | Meyers et al. | 135/66 |
| 2010/0007104 | A1 * | 1/2010 | Bennett | 280/7.15 |
| 2011/0187067 | A1 * | 8/2011 | Staggs | 280/30 |
| 2012/0181771 | A1 * | 7/2012 | Weaver | 280/250.1 |
| 2012/0205882 | A1 * | 8/2012 | Staggs | 280/30 |
| 2013/0082455 | A1 * | 4/2013 | Chen et al. | 280/650 |
| 2013/0292916 | A1 * | 11/2013 | Nabeta | 280/47.371 |

* cited by examiner

Fig. 1
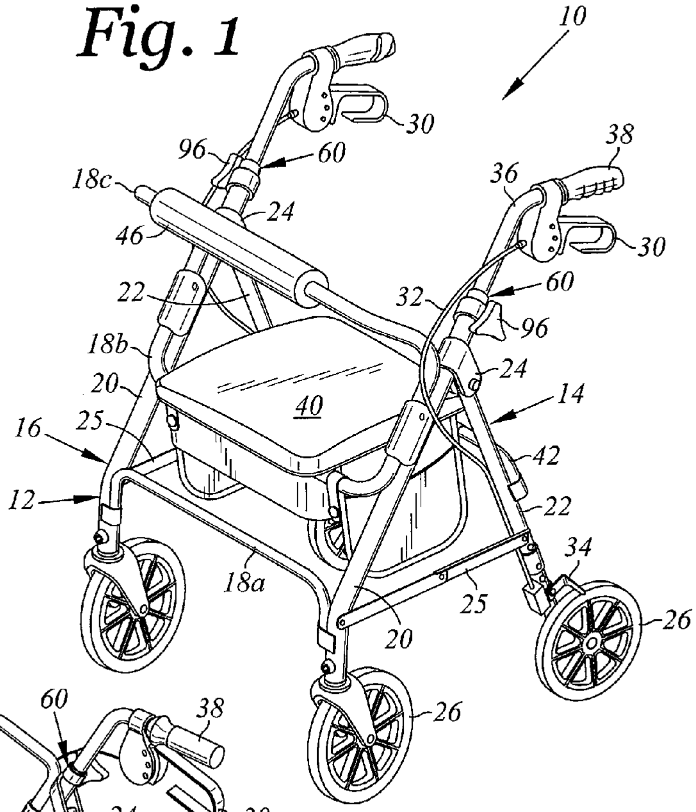
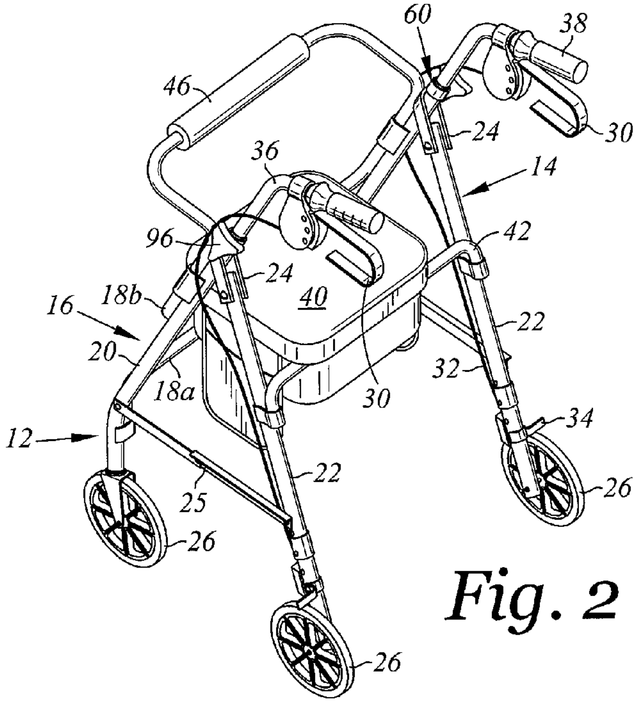
Fig. 2

WALKER WITH POSITIONABLE HANDLES

CROSS-REFERENCE TO RELATED APPLICATIONS

Not Applicable

STATEMENT RE: FEDERALLY SPONSORED RESEARCH/DEVELOPMENT

Not Applicable

BACKGROUND

This application relates to walkers of the type used by persons with impaired walking ability, such as the elderly or those with leg or back injuries. Walkers are known that have a frame forming a general U shape viewed from the top having a two opposing side frame portions joined by a front frame portion. The frame usually includes four legs at the bottom, handles on the top, and an open back which allows the user to grab the handles and fit within the cage. When a user is in the frame formed by the walker the user can lean to either side or lean forward and be stabilized by the walker, and can enter and leave the walker through the open back. The wheels allow the user to move the walker. There are usually at least two wheels on the bottom legs, usually on the front legs, with the other pair of legs having rubber tips to stop sliding when weight is placed on the walker frame. Sometimes each of the four legs has a wheel in which case a hand brake is typically provided at each handle and adjacent the front of the walker in order to allow the user to stop movement of the walker.

Some of these walkers have seats that are mounted to the front legs and rotatably mounted so the seat can fold into a vertical position when not in use and fold into a horizontal position extending toward the user during use. That allows the user to push the seat down, turn around within the walker frame and then sit on the seat. Unfortunately, the back rest formed by these walkers it typically a bare bar or a small backrest on a bar extending between the sides frame portions of the walkers and forming a portion of the front frame portion of the walker. Part of the difficulty in forming a suitable backrest is that the seat folds against the front portion of the frame and there is difficulty fitting the seat and a backrest in the same place while keeping the walker light enough for movement by an elderly or impaired person. There is thus a need for a more comfortable backrest, and for a way to securely fasten a backrest to a walker.

Further, when a user sits in seat in the walker it is often difficult for the user to get out of the seat and stand up. The user may grab the brake or handles to help leverage themselves out of the seat, but the handles are at the top of walker and users of walkers often have inadequate upper body strength or arm movement to easily grab the brake or elevated handles to help pull themselves out of the seat and into a standing position. There is thus a need for an improved walker that makes it easier for a user to go from the sitting to the standing position within the walker.

BRIEF SUMMARY

A standard walker with a frame with two opposing sides joined at the front of the walker is provided with a rotating joint between each handle and the frame. Advantageously each joint fastens to a rearwardly inclined leg on each side of the frame. The joint is releasably locked in a first position in which the handle is generally horizontal for walking. The joint is releasably locked in a second position in which that handle is closer to the seat making it easier to sit and stand.

There is thus provided a walker having a frame with two opposing sides joined at a front of the walker. Each side has front and rear side-frame members with wheels on the lower ends of at least the two front or two rear side-frame members. The walker has a seat connected to the frame and extending from the front toward a back of the walker and a generally horizontal handle at a top of each side. Each handle may have a hand actuated break handle in communication with a different one of the wheels and configured to restrain rotation of that wheel when the brake handle is actuated.

The improvements to this walker include two rotatable joints each having a lower and upper joint portion connected to rotate about a joint rotation axis. Each joint has its lower joint portion connected to a different side of the frame with the upper joint portion connected to a different handle member having one of the handles at a distal end of the handle member. Each joint has a first position in which the handle associated with the joint is generally horizontal and a second position in which that handle is lowered closer to the seat.

Further variations on this walker include locking the joints in the first position. The joint may be locked in the first position by placing the joint inside the side-frame member to which the joint is connected and also preferably restraining movement of the joint along a longitudinal axis of the side-frame member. This may be achieved by seeing that the joint is sized and configured so that it may fit inside of the side-frame member to which the joint is connected. The joint may alternatively be locked in the first position by placing a tubular sleeve over the joint to limit rotation of the joint and restraining movement of the joint along a longitudinal axis of the side-frame member. The tubular sleeve may be configured so it can be removably placed over the joint to limit rotation of the joint away from the first position and slid off the joint to allow rotation of the joint into the second position. The joint may be releasably held in the second position by connecting the frame member to a connector on the end of a support extending from or otherwise fastened to the frame. The second position advantageously places a distal end of the handle pointed toward a seat the seat. The second position advantageously places a handle member close enough to the seat so that a user can push downward on the handle member when sitting or when moving to the standing position. Further, the handle member may have a length that may be changed in order to vary a height of the handle on the handle member. Likewise, the joint may be located at different locations within the side-member in order to vary a height of the handle on the handle member. Advantageously, each joint has a lower portion releasably connected to its respective frame member.

The above walker and variations thereon may also include a backrest having an upper and lower portion with the upper portion connected to an upper cross-member extending between the sides of the walker. The seat is preferably rotatably connected to a cross-member located at the front of the frame and extending between the sides of the frame so the seat may be moved toward a vertical position to collapse the walker into a more compact configuration. The lower portion of the backrest is preferably releasably connected to that same cross-member. The backrest may have the lower portion releasably connected to a lower cross-member extending between the sides of the walker. Advantageously, the releasable connection may include one or more straps, hooks or clips.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a front perspective view of a walker of this invention with the seat in a deployed position;

FIG. 2 is a rear perspective view of a walker of this invention with the seat in a deployed position;

Figure 3A:
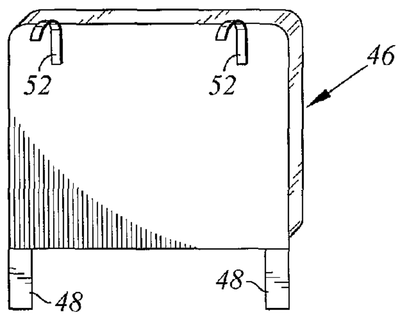
FIG. 3A is rear perspective view of a backrest having hooks at the top and straps at the bottom.
Figure 3B:
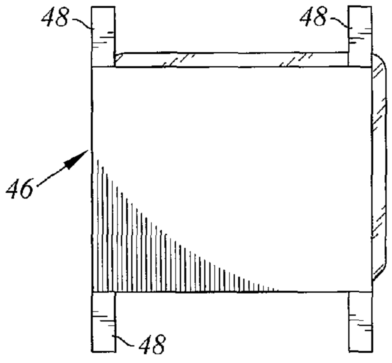
FIG. 3B is a rear perspective view of a backrest having straps at the top and bottom.
Figure 3C:
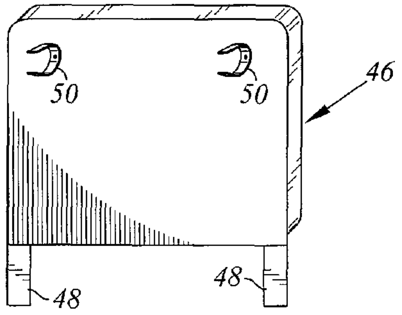
FIG. 3C is a rear perspective view of a backrest having clips at the top and straps at the bottom.
Figure 3D:
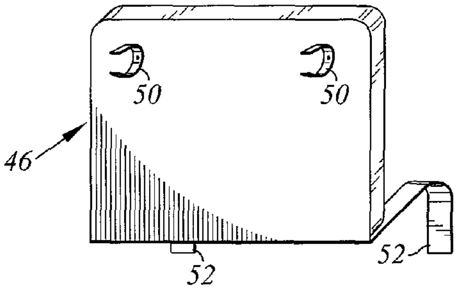
FIG. 3D is a rear perspective view of a backrest having clips at the top and forward extending hooks on the bottom.

The side frames 14, 16 each have oppositely inclined front and rear side-frame members 20, 22 joining at hinge 24. These side frame members 20, 22 will be referred to variously herein as legs or side-frame members or frame members or members. The side-frame members 20, 22 are inclined at a relative angle of about 30-60 degrees during use. A bottom frame member 25 joins lower portions of the front and rear members 20, 22 to form a generally triangular shaped side frame 14, 16. The lower member 24 is advantageously hinged at its center to allow front and rear members to fold adjacent each other with the hinged portions of lower member 24 folding adjacent each other. The frame 12 has a generally U-shape when viewed from the top, with the user facing into the open end of the U when walking behind the walker, with lower cross-member 18*a* joining the lower ends of the inclined front member 20 while upper cross member 18*c* joins the upper portions of the front member 20.

Figure 10:
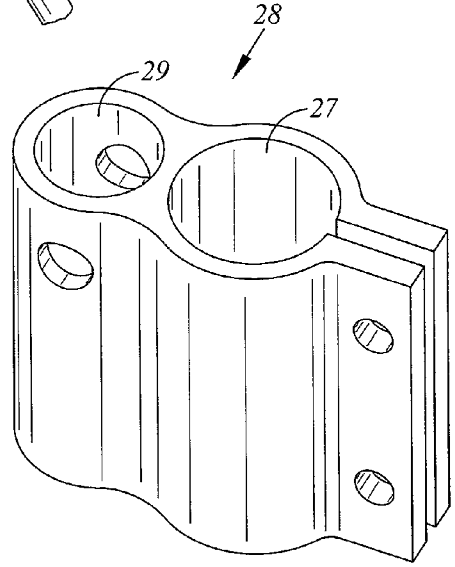
FIG. 10 is a perspective view of a joint used to connect a backrest frame member to a side frame member.

Referring to FIGS. 1 and 10, the side frames 14, 16 are advantageously connected to the cross frame member 18 using connectors 28. The connector 28 has a first tubular passage 27 or recess through which the back side frame member 22 passes and a second tubular passage 27 or recess through which the cross-frame member 18 passes. The cross frame member 18 has a general inverted U shape with opposing ends or legs parallel to or aligned with the back side frame member 22, and a middle portion extending generally horizontal between leg portions of the back side frame member 22 in each frame 12, 14. Set screws or friction fasteners can hold the legs of cross-frame member 18 to the connector. Set screws or friction fasteners can hold the connector 28 to the back side frame member 22. As shown in FIG. 10, a friction clamp is provided by splitting the connector 28 so opposing sides of the connector form at least the first tubular passage 27 and optionally the second passage 29, and clamping the sides together (as by threaded fasteners) to clamp the connector 28 against the back side frame member 22 inserted into the first hole 27. If desired, the two opposing sides of the connector 28 may be hinged at one end and held by bolts at the other end to provide a secure clamping force. Other connectors could be used.

The lower ends of the front and rear members have wheels 26 mounted thereon, preferably so the wheels can rotate about the wheel axis and also rotate about the longitudinal axis of the members 20, 22. In some situations only two wheels may be provided, preferably on the lower ends of the front members 20, with non-skid stops being provided on the ends of the members lacking wheels. At least two of the wheels 26 have a hand-actuated brake that includes a brake handle 30 hinged at one end to lengthen and shorten a brake cable 32 which extends to adjacent wheel 26 so as to actuate a wheel brake 34. The wheel brake 34 is shown as a pivoted bracket that rotates against the wheel 26 when the brake handle 30 is actuated to shorten the length of the cable 32. The brakes are shown on the rear wheels 26, but if only two wheels are provided the brakes will be on those two wheels.

The upper ends of the front inclined members 20 connect to handle members 36 which have a lower end aligned with the inclined front member 20, and have a rear end to which is mounted handle 38, with a bend between them to allow the handles 38 to be generally horizontal orientation to be gripped by a user during walking. The handles 38 are typically tubular parts made of rubber or other elastomeric material to increase friction during gripping. The handles 38 typically slip over the ends of cylindrical, tubular handle members 36. The handles 38 may be ribbed or may have curved ridges to accommodate a user's fingers.

A seat 40 is fastened to the frame 12. Advantageously, the seat 40 is generally horizontal in its deployed, use position and fastened to a cross member, preferably middle cross member 18*b* at the front of the frame 12. The seat is preferably also supported by a rear cross member 42 connected to side frames 12, 14, with the rear cross member 42 preferably extending between rear members 22. The rear cross member 42 may curve forward to allow the user to enter further into the frame 12 during use. But the cross members 18*b*, 42 supporting the seat 40 should be spaced sufficiently far apart to provide a stable support and prevent the seat from pivoting during use.

Instead of using cross-member 42 to support the rear portion of the seat 40, the seat could be supported on support tabs, flanges or brackets (44) fastened to side frames, preferably members 22, with the brackets extending inward sufficiently far to engage the seat 40. In use, the seat 40 is preferably fastened to cross member 18*b* in a way that allows rotation of the seat generally vertically, usually upward toward upper cross member 18*c*, or less preferably downward toward lower member 18*a*. Rotating the seat into a vertical position allows the user to enter further into the U-shaped enclosure formed by the frame 12 and allows for more compact collapsing of the frame 12 for storage and portability.

Figure 3E:
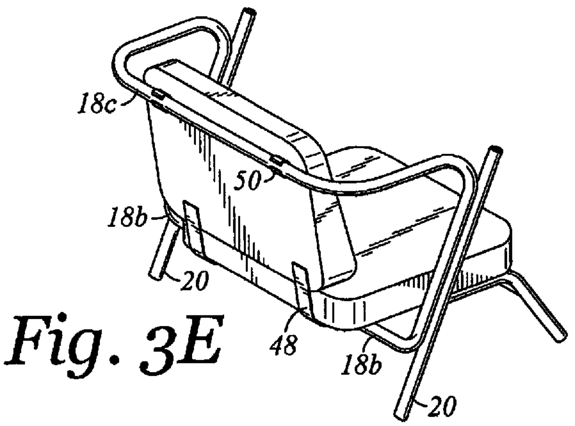
FIG. 3E is a perspective view of the backrest of FIG. 3C connected to the top and middle cross-members of a frame of the walker of FIG. 1.

The front portion of seat 12 may be connected to the cross member 18*a* (FIG. 11) by a C-clip, or a hinge to allow rotation, with the rearward portion of the seat resting against rear cross member 18*c* (FIG. 3E) or against support flanges, tabs or brackets 42 extending from rear member 22 of the side frames.

A backrest 46 is preferably also provided. A padded backrest 46 is shown in FIG. 1. But backrests comprising a foam tube around the upper cross member 18*c* are sometimes less comfortable than broader backrests. Thus, preferably a backrest 46 is provided that extends from the upper cross-member 18*c* to the seat 40. Referring to FIGS. 3A-3E, the backrest 46 may have various fastening means, such as straps 48, clips 50 or hooks 52 configured to engage or encircle one of the cross members 18*b*, 18*c*. The straps 48 may include elongated strips of flexible material fastened to the seat, preferably the seat bottom, having fastening mechanisms on the ends. Hook and loop fasteners, snaps, or ties can be used with one or two straps at each corner of the seat to fasten a strap to itself after encircling one of the cross members 18*b*, 18*c*. Various locations and orientations of straps 48 are depicted in FIGS. 3A-3E. The clips 50 may comprise C-clips having a generally C or U shaped cross-section in which the open end snaps over the cross-members 18*b*, 18*c*, especially if the cross-members are cylindrical tubes. The hooks comprise semi-spherical or similarly shaped hooks that extend over a sufficient portion of the cross-members 18*b*, 18*c* to suspend the backrest therefrom.

The use of various straps 48, clips 50 and hooks 52 provide means for releasably fastening the seat 40 and/or backrest 46 to the frame 12, and more specifically provide means for releasably fastening the seat 40 to members 18*b* 42, and/or for releasably fastening backrest 46 to cross-members 18*b*, 18*c*. Likewise, the various straps 48, clips 50 and hooks 52 provide mechanisms for releasably fastening the seat 40 to the frame 12.

The various frame members 18, 20, 22 and handle member 36 are usually tubular, preferably cylindrical tubes and less preferably rectangular tubes. One or more of these tubular members may be of adjustable length. The use of spring loaded detents mating with spaced holes in nested tubes of different diameter is commonly used to provide adjustment for walkers and other medical devices. Each adjustable length member may have nested, telescoping inner and outer tubes. The outer tube has spaced holes along one side but usually has spaced holes along two sides with the holes opposite each other. The inner tube has one set of holes, with a spring loaded projection extending through the holes. The outer tube is placed over the inner tube, and the projections moved inward to allow passage of the tube. The projection is resiliently urged outward into an aligned set of holes in the outer tube to lock the inner and outer tubes to each other.

Referring to FIGS. 1-2 and 4-7, each walker handle 38 is on the end of a handle member 36 which in turn is joined to the inclined side frame member 20 by a lockable, rotating joint 60 having a lower joint portion 62 which has an end that fits into an open end of the inclined side frame member 20, and an upper joint portion 64 which has an end that fits into the open end of a handle member 36. Preferably the mating portions of the joint portions 62, 64 and the frame 20 and handle member 36 are cylindrical tubes with the joint portions 62, 64 slightly smaller in diameter so they slide snugly inside the frame 20 and handle member 36, respectively. Various fastening mechanisms and methods can connect the joints to the frame.

The parts of the joint 60 preferably have stops which abut each other to limit rotation of the joint, as described later. The lower joint portion 32 advantageously has a lower end 66 that fits inside front side frame member 20 and an opposing, upper end 68 has a substantially flat face 70 (e.g., 70*a*, 70*b* described below) orthogonal to joint rotational axis 72 and generally parallel to the longitudinal axis of the joint portion 32. A hole 74*a* extends through the upper end 68 along the rotational axis 72, with the hole sized to fit a threaded fastener, such as bolt 76. The hole 74*a* is generally perpendicular to face 70*a*. An optional recess may be formed in the face 70*a* to receive a portion of a washer 78. Flats 80*a* are formed on the lower joint portion 62 with the flats 80*a* located and configured to abut corresponding stop portions 81*b* on the end 84 of the other joint portion 64 in order to limit relative rotation of the joint portions 62, 64 as described later. The flat face 70 is located at about the midline of the lower joint portion 62 with the flats 80*a* extending laterally away from the base of the flat face 70 to the periphery of the joint portion 62. There are advantageously two flats 80*a* slightly inclined relative to each other and intersecting in a plane containing rotational axis 72. The lower joint portion 62 preferably has a cylindrical bottom portion 66, with half of the upper portion 68 removed leaving the face 70*a*, ending at flats 80*a*. The upper portion 70*a* ends in a curved portion forming stop 81*a*.

The upper joint portion 64 is roughly the same as the lower portion 62, but rotated 180 degrees. The upper joint portion has an upper end 82 that fits inside the handle member 36, and an opposing, lower end 84 having a substantially flat face 70*b* orthogonal to joint rotational axis 72 and generally parallel to the longitudinal axis of the upper joint portion 64. A hole 74*b* extends through the lower end 84 along the rotational axis 72 and generally perpendicular to face 70*b*, with the hole 74*b* sized to fit the threaded fastener 74. An optional recess may be formed in the face 70*b* to receive a portion of a washer 78. One or more stops 80*b* are formed on the upper joint portion 64 with the stops located at the end of face 70*b* and extending laterally to the periphery of the upper joint portion 64. The flats 80*b* are located and configured to abut corresponding stop 81*a* on the end of lower joint portion 62 to limit relative rotation of the joint portions 62, 64. The upper joint portion 62 preferably has a cylindrical top portion 82, with half of the lower portion 84 removed leaving the face 70*b*, ending at the curved stop 81*b*. The curved stop 81*b* is located relative to flats 80*a* so that the stop 81*b* abuts flats 80*a* to limit relative rotation of the parts. The top portion 82 is slightly smaller than the half-cylindrical top portion 84 to form a shoulder 83.

The bolt 76 passes through the holes 74*a*, 74*b* and washer 78 to engage a threaded fastener and clamp the joint portions 62, 64 together, with the washer fitting into the optional recess in the faces 70*a*, 70*b* when the recess is present. Alternatively, threads could be formed in hole 74*b*. Loosening or tightening of the fastener 76 varies the clamping force with which faces 70*a*, 70*b* are urged toward each other and washer 78, thus varying the frictional force opposing rotation of the joint. The fastener 76 thus adjusts the force needed to rotate the joint along axis 72 and forms the rotational axis of that joint.

In the depicted embodiment, flats 80*a* extend laterally from the flat face 70*a* and are offset from but generally parallel to the joint axis 72, while flats 80*b* extend laterally from the flat face 70*b* and are offset from but generally parallel to the joint axis 72. The stops 81*a* are preferably formed on the distal-most end of the end 68 while the stops 81*b* are formed on the end portion 84. As the lower and upper joint portions 62, 64 rotate about axis 72 and bolt 76, the flats 80*a* abut stop 81*b* while the flats 80*b* abut stop 81*a* to limit the relative rotation of portions 62, 64. The location and orientation of the flats 80*a*, 80*b* and 81*a*, 81*b* on the mating parts 62, 64 can be varied to limit the rotation of the joint parts 62, 64, and thus limit the rotation of handle portion 36 relative to front frame member 20. The surfaces 80*a*, 80*b* and 81*a*, 81*b* thus form stops to limit the relative rotation of the joint portions 62, 64.

The upper end 82 of the upper joint portion 64 is sized and configured to fit into the open end of tubular handle member 36 and be fastened thereto. A pin may pass through the nested parts 82, 36 to releasably fasten the parts together, or a threaded fastener, or other fastening mechanisms. The parts may also be permanently fastened as by adhesives, melting, soldering or welding. Advantageously, the upper end 82 may be slightly smaller in diameter than the lower end 84 of the joint portion 62 so as to form a flange or shoulder 83 against which handle member 36 abuts in order to position the upper joint portion 62 relative to the handle portion 36.

The lower end 62 of lower joint portion 62 is sized and configured to fit into the open end of tubular front side frame member 20. Advantageously a hole 90*a* passes through the lower end 62 with a releasable fastener holding the lower joint portion 62 to the frame member 20. Advantageously, the end of the front side frame member 20 has a hole 90*b* in it through which a fastener may pass. The fastener preferably takes the form of a bolt 92 with a threaded end and with the bolt optionally extending from a curved clip 94. The clip 94 is of resilient material such as spring steel or plastic and may be sized and shaped to fit around and snap around the side frame member 20 at the location of the hole 90*b*. In use, the bolt 92 passes through holes 90*a*, 90*b* to fasten the lower end portion 62 to the frame member 20, with the clip 94 holding the bolt in place on the frame 20. A knob 96 with a threaded recess threadingly engages the threaded end of the bolt 92 to allow a user to securely and releasably fasten the lower joint portion 62 to the front frame member 20. An optional washer, curved to conform to the shape of the abutting portion of the frame member 20, may be interposed between the knob 96 and the frame member 20.

In the position shown in FIGS. 1-2, the rotating joint 62 allows handle member 36 and handle 30 to be rotated about joint axis 72, so as to place the walker handle 38 and brake handle 30 closer to the legs of a user when seated on seat 40, and to orientate the walker handle 38 and brake handle generally perpendicular to the legs of a user when seated on seat 40. In this orientation, the handle member 36 is more aligned with but offset from the back side frame member 22, and is much closer to the seat 40 and seated user than is the case when the walker is in the normal walking configuration. Advantageously, the joint hinge axis 72 and thus the joint 62 are aligned so the walker handle 38 would abut the back side frame member 22.

In the preferred embodiment, the rotational axis is generally parallel to the front cross-frame members 18*a*, 18*b*, and 18*c* and generally perpendicular to the plane containing the side frames 14, 16. Thus, when the handle member 36 rotates about joint axis 72, the handle 38 preferably hits back side frame member 22 if rotated far enough. In that second position the walker handle 38 and brake handle 30 are closer to the seat 40, and in which the handle member 36 is optionally inclined along an edge of the seat and more easily reached by a seated user. A user seating himself or herself onto seat 40 may grab the handle member 36 to more easily achieve seating. A user already seated on seat 40 may more easily push downward on the handle members 36 which are much closer to the seat than the handle 38 would normally be when in the walking configuration in order to rise to a standing position. Likewise, a seated user may use the bent handle member 36 or hand brake 30 or walker handle 38 to help leverage or pull the user off the seat 40 and into a standing position. Thus, the joint preferably has a second position which locates the walker handle 38, any grip 30 and handle member 36 closer to the seat 40 where the walker's user may more easily grab them to help sit or stand.

The parts 80*a*, 80*b* and 81*a*, 81*b* provide stops on the two rotating parts of each joint 60, with the stops located to limit rotation of the joint 60. The stops 80*a*, 80*b* and 81*a*, 81*b* are preferably symmetrically located on opposing sides of the plane along the longitudinal axis of the joint portions 62, 64 and through rotational axis 72, so that the rotational orientation of the joint 60 relative to the cross-frame member 20, 22 to which it is fastened, is not as critical. The joint 60 can be put in either of two ways and still allow the joint to rotate the attached handle member 36 and walker handle 38 toward the seat 40, with the stops 80*a*, 80*b* and 81*a*, 81*b* limiting the motion so the handle 38 ends up at a predetermined location relative to the seat 40. The stops 80*a*, 80*b* and 81*a*, 81*b* provide means for locking the joint 60, and the connected handle member 36, walker handle 38 and brake handle 30 in a predetermined location adjacent to and relative to the seat 40. And the rear cross-member 22. It should be recognized that the stops 80*a*, 80*b* and 81*a*, 81*b* only restrict rotation in one direction, but that is believed sufficient since the use of the handle member 36, walker handle 38 and brake handle 30 in allowing the user to sit and stand generally involve pushing those parts in a direction that engages the stops.

Figure 6:
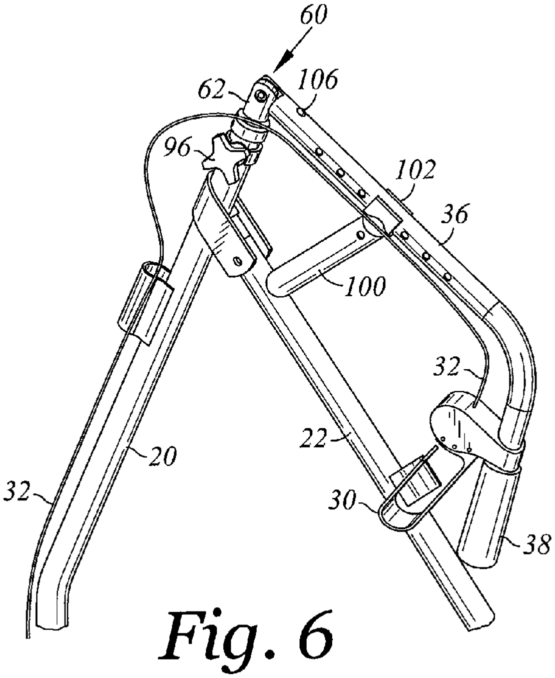
FIG. 6 is a side view of a side-frame of the walker of FIG. 1 with a handle member and handle in a folded configuration.

Referring to FIG. 6, rather than rely on walker handle 30 resting against back side frame 22 in order to hold the joint in this second position and provide an inclined handle member 36 to assist a seated user, the handle member 36 may be more firmly held by one or more handle supports 100 fastened to the back side frame member 22. The handle support 100 has one end fastened to the back side frame member 22 and an opposing end having a connector 102 configured to releasably connect to the handle member 36. Advantageously, the connector 102 may include a clip 102 of resilient material such as spring steel or plastic configured to snap around a portion of the periphery of handle member 36. At the abutting location the handle member 36 is a cylindrical tube so a U-shaped or C-shaped clip 102 can snap over the major diameter of the tubular cross section of the handle member 36 to help retain the handle member 36 in contact with the support 102. Thus, a user may push downward against the inclined handle member 36, with the user's weight being transferred through the bent handle member 36 through the support 100 and to the frame member 22, with the connector 102 helping maintain the handle in contact with the support 100 if the user's hands apply lateral force. Rotating the handle in alignment with the frame member 22 pulls the handle member 36 out of the connector 102. Thus, support 100 provides a more sturdy handle member 36 and gripping members 30, 38, while the connector 102 helps maintain that sturdy support during use, but releases the handle member 36 when not in use. The support 100 and connector 102 provide means for retaining the joint 60, handle member 36, walker handle 38 and any brake handle 30 in the second position.

Figure 4:
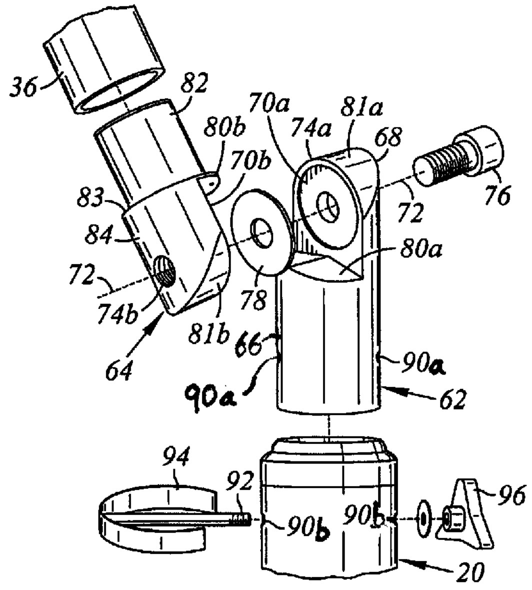
FIG. 4 is an exploded perspective view of a rotating joint for use with the walker of FIG. 1.
Figure 5:
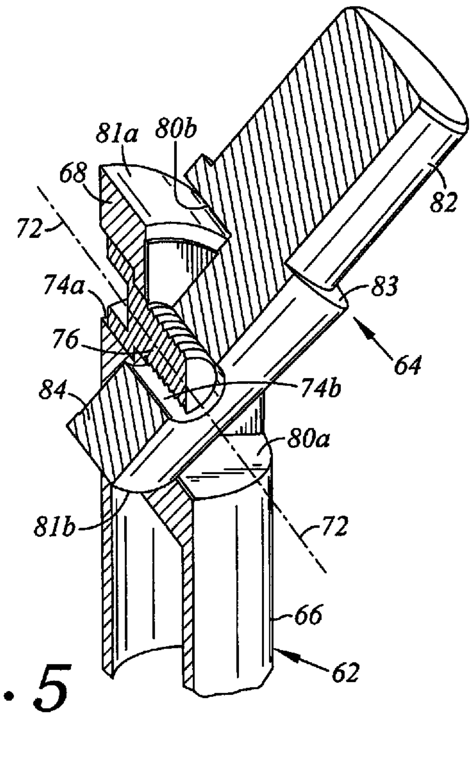
FIG. 5 is a partially sectioned view of a portion of the rotating joint of FIG. 4.
Figure 7:
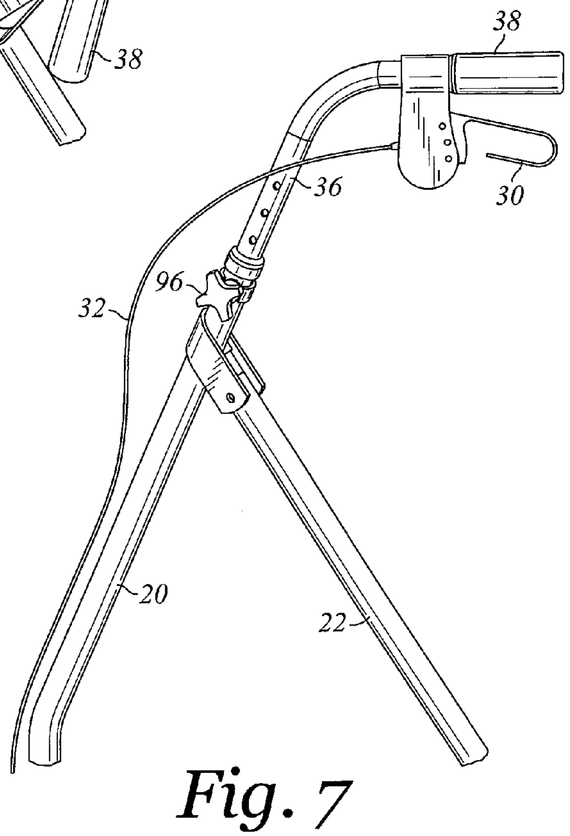
FIG. 7 is a side view of a side frame of the walker of FIG. 1 with a handle in an extended, walking configuration.

Referring to FIGS. 1, 4 and 5, the rotating joint 60 should be locked into a non-rotating configuration during use of the walker 10 for walking—when the joint 60 is in the first position for walking behind the walker. In the walking configuration shown in FIG. 1, the rotatable joint and the handle member 36 are in a first position in which the walker handle 38 and brake handle 30 are generally horizontal. The rotatable joint has a lower end aligned with the side-frame member to which it is connected, with FIG. 1 showing the joint connected to the front, side-frame member 20. To lock the joint 60 against rotation, the knob 96 is removed as is fastener 92 and the joint 60 with portions 62, 64 aligned along a common axis, is slid into the front side-member 20 until the holes 90 align with holes 106 on handle member 36, at which point the fastener 92 is passed through the aligned holes to fasten the handle member 36 to the frame member 20 with the joint 60 inside the frame member 20 as shown in FIG. 7. Optionally, the knob 96 may then be connected to the end of fastener 92 and tightened to lock the handle member 36 in place. In short, the joint is slid into the tubular end of the side-frame member 20, 22 to which the joint is connected, so the side-frame member restricts rotation of the joint and maintains the joint portions 62, 64 in alignment with the longitudinal axis of the side frame member inside of which the joint is placed.

Figure 9:
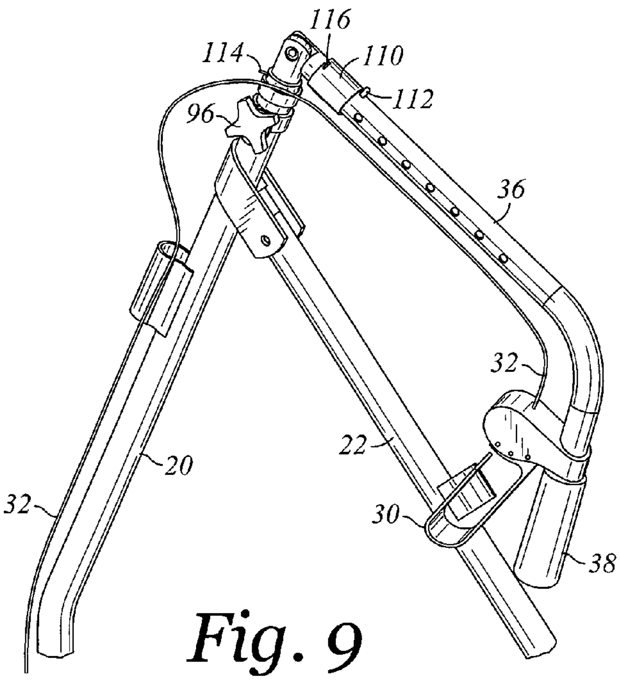
FIG. 9 is a side perspective view of a side frame of the walker of FIG. 1 with a handle in a folded configuration and the sleeve of FIG. 8 in an unlocked position. detailed description.

A series of holes 106 may be formed thorough the handle member 36 in order to allow adjustment of the vertical location of walker handle 38 and brake handle 30. Alternatively, the handle member 36 may itself have two nested tubes interlocked by releasable detents as known in the art. Such releasable detent is shown in FIGS. 10-20 of U.S. Pat. No. 7,926,834, the entire contents of which are incorporated herein by reference. FIG. 9 of U.S. Pat. No. 7,926,834 shows a construction similar to the bolt 92 and clip 94 which may also be used.

Figure 8:
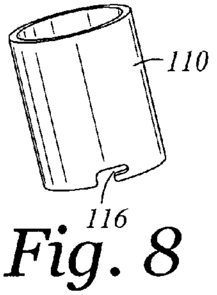
FIG. 8 is a perspective view of a sleeve for locking the rotating joint of FIG. 4.

The above locking of the rotating joint 60 requires the joint 60 fit within the frame members 20. An alternative locking mechanism to lock the joint 60 in the first position is shown in FIGS. 8-9, in which the joint 60 need not fit inside the frame members. A tubular sleeve 110 is placed around the handle member 36 with the sleeve 110 large enough in cross-sectional shape or diameter to slip over the joint 60 when the joint portions 62, 64 are aligned along a common axis, but with the sleeve 110 small enough in cross-sectional shape or diameter to impede rotation of the joint 60, although rotation of a few degrees may be desirable to make the sleeve 110 easier to slip on and off the joint. Thus, the sleeve 110 can fit over the joint 60 and lock the joint in the handle first position of FIG. 1, in which the handle member 36 aligned with the frame member 20 and the walker handle 38 and brake 30 are in a generally horizontal position suitable for walking.

By sliding the sleeve 110 away from the joint 60 and onto the handle member 36 the joint can rotate. As the handle member 36 is rotated downward gravity will urge the sleeve 110 to slide downward toward the walker handle 38 and brake handle 30 thus keeping the sleeve 110 from inadvertently restraining rotation of joint 60. When the handle member 36 is rotated into the first position the handle member 36 is in alignment with front side-frame member 20 and gravity will urge the sleeve 110 toward the joint 60 where it can be slipped over the joint 60 and lock it in place.

A motion stop 112 may be placed on the handle member 36 adjacent to the end connected to the upper joint member 64 in order to limit the motion of sleeve 110 along the length of handle member 36. The stop 110 may comprise a projection extending from the handle member 36 a distance sufficient to engage the sleeve 110 and prevent the sleeve from passing the stop, or it could take the form of a flexible cord connecting the sleeve 110 and handle member 36 with the cord of sufficient length to allow unlocking and rotation of joint 36. If desired, the end of sleeve 110 adjacent to the lower portion 62 of joint 60 when locked, may be configured to engage a mating portion of the frame member 20 or the lower joint portion 62 in order to releasably connect the parts together. For example, threads or bayonet lugs 114 on the frame member 20 or joint portion 62 mating with recesses 116 on the sleeve 110 (or vice versa) can provide a releasable rotating connection.

Fastening the joint 60 inside of the frame member 20 or using the sliding locking sleeves 110 to lock joint 60 provide means for releasably locking the rotating joint 60 and/or the handle member 36 (and walker handle 38) into an extended, walking configuration. This is the first, walking position. The use of various straps 48, clips 50 and hooks 52 provide means for releasably fastening the seat 40 and/or backrest 46 to the frame 12, and more specifically provide means for releasably fastening the seat 40 to members **18*b* 42, and/or for releasably fastening backrest 46 to cross-members 18*b*, 18*c***.

Configuring the joint 60 to fit inside of the frame member 20 and releasably fastening it there provides a mechanism for locking the joint 60 and/or the handle member 36 (and walker handle 38) into an extended, walking configuration. Likewise, the sliding locking sleeve 110 provides a locking mechanism for releasably locking the rotating joint 60 and/or the handle member 36 (and walker handle 38) into an extended, walking configuration.

Figure 11:
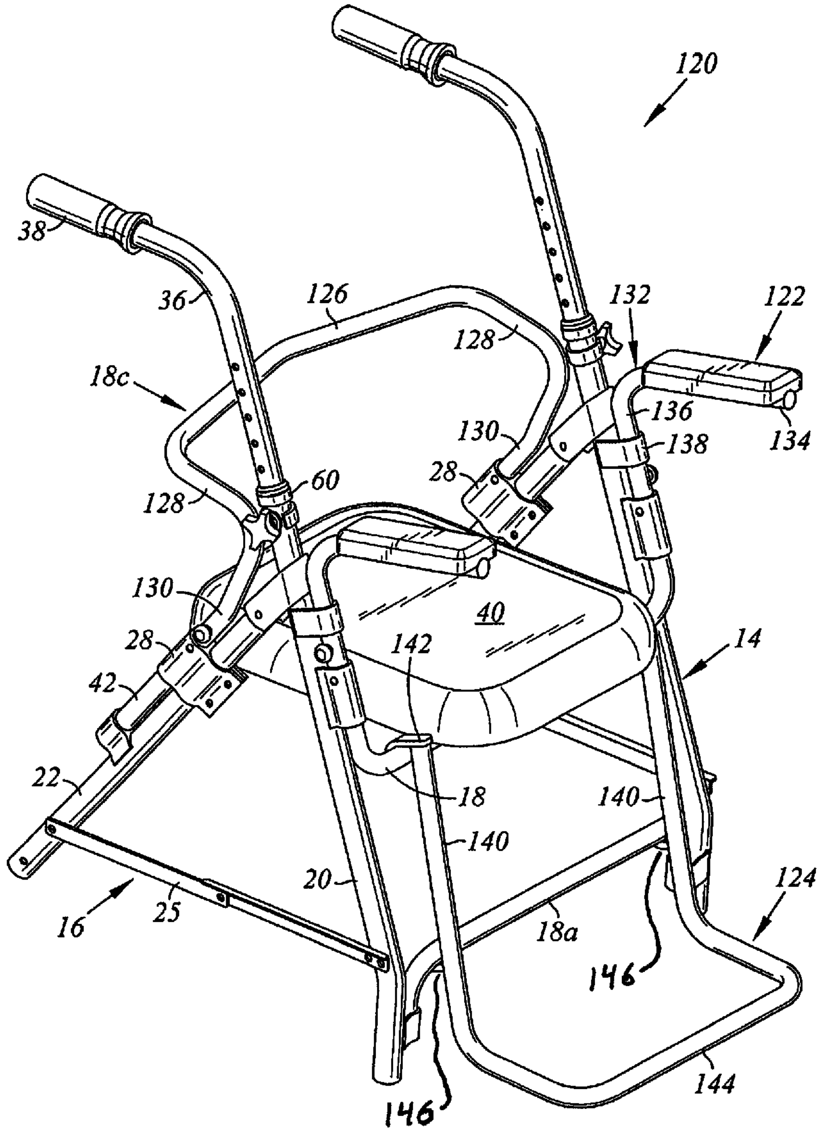
FIG. 11 is a perspective view of a walker having a footrest and armrests; and Referring to FIGS. 1-3E, a walker 10 has a frame 12 that includes first and second side frames 14, 16 and one or more cross braces 18 (18*a*, 18*b*, 18*c* shown below), with lower, middle and upper cross braces 18*a*, 18*b*, 18*c* respectively being shown joining the front portions of side frames 14, 16. As used herein, the forward or front direction refers to the direction a user faces when walking the walker 10, with the rearward or back direction being opposite thereto. The left and right directions are relative to the user facing forward. The inward direction refers to the inside of the volume enclosed or partially enclosed by the frame, preferably extending toward a vertical longitudinal axis of that volume. Outward refers to the opposite direction. The downward direction is toward the surface on which the user and walker rest and the upward direction is in the opposite direction, with upward and downward representing opposing directions along a vertical axis. Thus, lower cross member 18*a* joins the front, lower end of side frames 14, 16, while top cross member 18*c* joins the upper portion of the side frames.

Referring to FIG. 11, the basic form of the walker 10 of FIG. 1 can be used as a wheelchair/walker 120 with two armrests 122 and a foot support 124. The basic construction of the frame 12 remains the same except the location of the cross-frame back member 18 so the person in seat 40 looks the opposite direction as in FIG. 1. Thus, there is a front side frame member 20 having lockable, rotating joint 60 connected to adjustable length handle member 36 with generally horizontal handle 38. The rear side frame member 22 connects to the front side frame member 20 at a joint 24 which is preferably a hinged joint to allow the frame 12 to collapse for transportation and storage. The lower hinged member 25 joins the lower portions of side frame members 20, 22, and is preferably hinged to allow collapse of the frame. The lower and middle cross frame members **18*a* and 18*b* extend between the front side frame members 20 on opposing sides 12, 14 with the lower member 18*a* acting as a stop for footrest 124 and the middle cross-member supporting the footrest that is hooked over the cross member 18*b*. Seat 40 rests on the middle cross-frame member 18*b* and cross member 42**.

But the top cross-member **18*c* now preferably extends between rear side frame members 22 so that the backrest portion formed by cross-member 18*c* relative to seat 40 allows the user seated on seat 40 to rest his/her feet on footrest 124 and face the direction in which the walker 120 moves. In the walker of FIG. 1, a person on seat 40 faces the opposite direction, so the location of the top cross-frame member 18*c* is moved accordingly to relocate the back support for the seated user. This relocation of cross-frame member 18*c* can be achieved various ways, but preferably the cross-frame member 18*c* has a middle back portion 126 against which a user's back rests when seated on seat 40. The member 18*c* has generally horizontal offsets 128 on opposing sides of the middle portion 126, with the offsets 128 extending toward the inclined rear side support 22, and ending in depending legs 130 each of which is fastened to a rear side frame member 22 on an opposing side frame 12. 14**.

Referring to FIGS. 10-11, the legs 130 are preferably connected to the rear side frame member 22 by a connector 28, with lower legs 130 extending into the second passage 29 of the connector, while rear frame member 22 extends through the first passageway 27. Advantageously, the connector 28 may have an opening for a detent on the leg 130 to lock the leg 130 and member 18*c* to the frame member 22 and respective side frames 14, 16. When the walker 120 is to be used as a wheelchair, the connector 28 is fastened to the back side support members 22 as shown in FIG. 11, and the cross-member 18*c* positioned as desired to support the user's back or a backrest if provided. When it is desired to use the walker 10 as a walker, the connector 28 is connected to the front side member 20 as shown in FIG. 1. The connector 28 and backrest 126 may be used as an aftermarket part as it allows an existing tube of a walker to be connected through one of passageways 27, 29, while the other passageway can be used to hold the depending leg 130 of the backrest 126. Alternatively, the connector 28 may be replaced by a tube fastened to the front side frame member 20 or the rear side frame member 22, such as by welding or bonding, with the legs 130 releasably nesting into the tube. As desired, detents as described herein or sew screws or knobs with threaded fasteners (e.g., knob 96) may be used to secure the legs 130 of a backrest to the tube and walker.

Referring to FIG. 11, armrests 122 has a generally L shaped member 132, preferably a tube, having a generally horizontal leg to which is fastened an arm support portion 134, and a connecting leg 136 which aligns along and is connected to the front side frame member 20. The L shaped member 132 may connect to the front side member 20 permanently as by welding, bonding, adhesives, etc., but preferably is connected by bracket 138. Bracket 138 has a tubular passage through which the connecting leg 136 extends. The bracket 138 preferably clips onto the front side support frame 20 so as to be removable, but the bracket could be permanently fastened (e.g., welding, adhesives) to the respective side frame 12, 14 to which it is connected. Advantageously, the tubular passage through the bracket 138 and the leg 136 are sized so that L shaped member and arm support 134 can rotate about the axis of the leg 136 passing through the bracket 138, thus allowing the arm support portion 134 to move in a plane generally parallel to the seat 40. The connecting leg 136 advantageously nests with the middle cross-frame support 18*b*, and preferably fits inside the upper end of a tubular support 18*b*. More preferably, the leg 136 and nesting portion of the cross-frame member 18*b* nest along a sufficient length that the position of the leg 136 can be adjusted vertically, in order to provide vertical positioning of the arm support 134. A detent mechanism can be provided to allow for incremental adjustment of the nested portions of leg 136 and cross-frame member 18*b*. Alternatively, one or more holes in bracket 138 can cooperate with a detent resiliently urged outward from the lower legs portion 136 to engage the holes to provide adjustment. Such adjustable detent mechanisms are believed to be known in the art.

Referring to FIG. 11, during use the footrest 124 has a pair of generally vertical legs 140 with their top ends having a connector 142, such as a hook, configured to releasably engaging the cross-frame member 18*c*. Preferably the hook-like connector 142 is a curved piece of material that hooks over and hangs from the cross member 18*c*, with the legs 140 spaced apart so the connectors 142 are on opposing sides of the seat 50. The lower end of legs 140 are connected to a bottom 144 that may take various forms sufficient to allow a person on seat 40 to rest their feet while the walker 120 is moved. The bottom 144 I shown as a U-shaped portion in a plane generally orthogonal to legs 140, but the bottom could be a rectangular shaped portion or even a solid sheet of material rather than an open section as shown. The legs 140 are preferably long enough so the lower end rests against the lower cross-frame member 18*a*. Advantageously, a lower support flange 146 is connected to each leg 140 and located so that when the footrest 124 is connected to or hangs from the cross-member 18*b*, the lower flange 146 abuts the lower cross member 18*a*. Advantageously, the lower flange 146 advantageously abuts the bottom of the cross-member 18*c*, so that the connector or hook 142 and the lower flange limit the movement of the legs 140 along the direction of the legs. That stabilizes the footrest 124. If desired, the connector 142 and flange 146 could comprise clips that releasably snap over the respective cross-members 18*b*, 18*a* to hold the footrest 124 in a stable position on the chair 120.

During use, the footrest 124 may be removed or attached. When attached, the connector 142 is hooked over the cross-frame member 18*c* with the lower end of the legs 140 hitting the bottom cross-frame member 18*a* to position the bottom 144. A user may rest his or her feet on the bottom 144 when seated on seat 40. In this orientation the walker 120 may be pushed by another person as a wheelchair, with both persons facing forward. Optionally, the footrest 124 may be removed entirely and set against a wall or suspended from connectors 142 or bottom 144. The footrest 124 may be used with the walker 10 or 120. It may also be sold as an aftermarket part. Various walkers have cross members 18*a*, 18*b* and once the distance between those members and the size of those members are known, the connector 142 and flange 146 can be located along the length of legs 140 to provide a releasable connection with or contact with the respective cross members 18*a*, 18*b*.

Also during use, a seated person may rest his or her arms on the arm support(s) 134, using detents and nested portions of legs 136 and cross-member 18*c*, or legs 136 and bracket 138 allowing height adjustment of the arm supports 134. As desired, the armrests 122 may be removed by removing legs 136 from the brackets 138, or by removing brackets 138 and the accompanying portions of the armrest. The armrest 122 and bracket 138 may be provided separately as an aftermarket part for use on various walkers.

Further, during use, the lockable, rotating joint 60 may be used to allow handle member 36 to be rotated to a generally horizontal position against arm support 134, positioning handle 38 generally vertical for more easy use by a seated person to stand. In this configuration, the arm support 134 helps support the handle 38 against downward movement. Alternatively, the arm support 134 may be rotated about the longitudinal axis of leg 136 so it does not hit the handle member 36. That allows the handle member 36 to rotate further downward, placing the grip 28 and brake handle 30 closer to the seat 30. As the armrests 134 on walkers or wheelchairs may sometimes be uncomfortably high for the user, the lower and more accessible handle 36 and brake handle 30 are easier to use in assisting a sitting person to move off the seat 40 and stand.

Further, during use the connector 28 may be removed from the back side frame member 22 and connected to the front side support member 20 (FIG. 1) to flip the cross-member 18*c* to face the other way so the walker can be used as a walker. This relocation of the connector 28 may require removing the bracket 138 and armrest 122.

The above description has the handle member 36 extending from the front legs 20 (front side-frame member 20). But the handle member 36 could extend from the rear leg 22 and still be configured in various ways to position the walker handle 38 and brake handle 30 at the location depicted in the Figures. Thus, given the present disclosure, one skilled in the art could readily connect the rotatable joint 60 to either front side-frame members or legs 20 or rear side-frame members or legs 22. Preferably a joint 60 is connected to each of the front side-frame members 20 or each of the rear side-frame members 22 because the walker 10 would then have a symmetric construction and appearance. But it is believed possible, although less desirable, to have one joint 60 connected to front side-frame member 20 and another joint 60 connected to a rear leg member 22, with both of the walker handles 38 in the position shown in FIG. 1.

The above description is given by way of example, and not limitation. Given the above disclosure, one skilled in the art could devise variations that are within the scope and spirit of the invention disclosed herein, including various ways of fastening the backrest to the seat or frame. Further, the various features of the embodiments disclosed herein can be used alone, or in varying combinations with each other and are not intended to be limited to the specific combination described herein. Thus, the scope of the claims is not to be limited to the illustrated embodiments.

The invention claimed is:

1. A walker having a frame with two opposing sides joined at a front of the walker, each side having front and rear side-frame members with wheels on the lower ends of at least the two front or two rear side-frame members, the walker having a seat connected to the frame and extending from the front toward a back of the walker and a generally horizontal handle at a top of each side, the walker comprising:

two rotatable joints each having a lower and upper joint portion connected to rotate about a joint rotation axis and each joint having its lower joint portion connected to a different side-frame member on a different side of the frame with the upper joint portion connected to a different handle member having one of the handles at a distal end of the handle member, each joint having a first position in which the handle associated with the joint is generally horizontal and a second position in which that handle is lowered closer to the seat;

wherein each joint is locked in the first position by placing the joint inside the side-frame member to which the joint is connected and restraining movement of the joint along a longitudinal axis of the side-frame member.

2. The walker of claim 1, wherein each joint is sized and configured so that it may fit inside of the respective side-frame member to which the joint is connected.

3. The walker of claim 1, wherein the second position places a distal end of each handle pointed toward the seat.

4. The walker of claim 1, wherein the second position places a respective handle member close enough to the seat so that a user can push downward on the respective handle member when sitting or when moving to the standing position.

5. The walker of claim 1, wherein at least one of said handle members has a length that may be changed in order to vary a height the respective handle of said at least one of said handle members.

6. The walker of claim 1, wherein at least one of said joints may be located at different locations within the respective side-member in order to vary a height of the respective handle on the respective handle member.

7. The walker of claim 1, further wherein each joint has its lower joint member releasably connected to the respective frame member.

8. The walker of claim 1, further comprising a backrest having an upper and lower portion with the upper portion connected to an upper cross-member extending between the sides of the walker.

9. The walker of claim 8, wherein the seat is rotatably connected to a cross-member located at the front of the frame and extending between the sides of the frame, and wherein the lower portion of the backrest is releasably connected to that same cross-member.

10. The walker of claim 8, wherein the backrest has a releasable connection between the lower portion of the backrest and a lower cross-member extending between the sides of the walker.

11. The walker of claim 10, wherein the releasable connection comprises one of straps, hooks or clips.

12. The walker of claim 1, wherein each handle has a hand actuated brake handle in communication with a different one of the wheels and configured to restrain rotation of that wheel when the brake handle is actuated.

13. The walker of claim 1, further comprising rotational-limiting stops on at least one of said joints to position the respective handle member in the second position.

14. A walker having a frame with two opposing sides joined at a front of the walker, each side having front and rear side-frame members with wheels on the lower ends of at least the two front or two rear side-frame members, the walker having a seat connected to the frame and extending from the front toward a back of the walker and a generally horizontal handle at a top of each side, the walker comprising:

two rotatable joints each having a lower and upper joint portion connected to rotate about a joint rotation axis and each joint having its lower joint portion connected to a different side-frame member on a different side of the frame with the upper joint portion connected to a different handle member having one of the handles at a distal end of the handle member, each joint having a first position in which the handle associated with the joint is generally horizontal and a second position in which that handle is lowered closer to the seat, wherein each joint is sized and configured so that it may fit inside of the respective side-frame member to which the joint is connected.

15. A walker having a frame with two opposing sides joined at a front of the walker, each side having front and rear side-frame members with wheels on the lower ends of at least the two front or two rear side-frame members, the walker having a seat connected to the frame and extending from the front toward a back of the walker and a generally horizontal handle at a top of each side, the walker comprising:

two rotatable joints each having a lower and upper joint portion connected to rotate about a joint rotation axis and each joint having its lower joint portion connected to a different side-frame member on a different side of the frame with the upper joint portion connected to a different handle member having one of the handles at a distal end of the handle member, each joint having a first position in which the handle associated with the joint is generally horizontal and a second position in which that handle is lowered closer to the seat, wherein each joint may be located at different locations within the respective side-member in order to vary a height of the associated handle on the respective handle member.

* * * * *